(12) United States Patent
Yang et al.

(10) Patent No.: US 11,026,309 B2
(45) Date of Patent: *Jun. 1, 2021

(54) LED DRIVE CIRCUIT WITH A PROGRAMMABLE INPUT FOR LED LIGHTING

(71) Applicant: FAIRCHILD SEMICONDUCTOR CORPORATION, Phoenix, AZ (US)

(72) Inventors: Ta-Yung Yang, Milpitas, CA (US); Chuh-Ching Li, Taoyuan County (TW); Ming-Chieh Lee, Pingtung County (TW); Kuo-Hsien Huang, Taipei County (TW)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/701,366

(22) Filed: Dec. 3, 2019

(65) Prior Publication Data
US 2020/0107414 A1 Apr. 2, 2020

Related U.S. Application Data

(63) Continuation of application No. 16/521,834, filed on Jul. 25, 2019, now Pat. No. 10,531,528, which is a
(Continued)

(51) Int. Cl.
*H05B 45/30* (2020.01)
*H05B 45/37* (2020.01)

(52) U.S. Cl.
CPC ............. *H05B 45/37* (2020.01); *Y02B 20/30* (2013.01)

(58) Field of Classification Search
CPC ............ H05B 33/0815; H05B 33/0845; H05B 33/0878; H05B 33/0887; H05B 45/37; H05B 45/382; H05B 45/385
(Continued)

(56) References Cited

U.S. PATENT DOCUMENTS 4,916,530 A 4/1990 Neilson et al.
5,982,640 A * 11/1999 Naveed ............. H02M 3/33523
363/21.15
(Continued)

FOREIGN PATENT DOCUMENTS

CN 101159416 A 4/2008
CN 201131071 Y 10/2008
(Continued)

OTHER PUBLICATIONS

Supertex HV9903 White LED Driver, Initial Release, dale made available to the public unknown {p. 11 is dated Oct. 17, 2003) pp. 1-12. {C) Supertex Inc., 1235 Bordeaux Drive, Sunnyvale, CA 94089.
(Continued)

*Primary Examiner* — Tung X Le
(74) *Attorney, Agent, or Firm* — Polansky & Associates, P.L.L.C.; Paul J. Polansky

(57) ABSTRACT

An LED (Light Emitting Diode) drive circuit includes a magnetic device, a power transistor, a current-sense resistor, and a controller. The magnetic device has a first terminal for receiving an input voltage derived from an input of the LED drive circuit, and a second terminal. The magnetic device generates an output current to drive at least one LED. The power transistor has a drain coupled to the second terminal of the magnetic device, a control terminal, and a source. The current-sense resistor has a first terminal coupled to the source of the power transistor for forming a current input
(Continued)

signal, and a second terminal coupled to ground. The controller generates a switching signal coupled to control the power transistor to switch current through the magnetic device based on both a programmable signal derived from the input of the LED drive circuit, and the current input signal.

20 Claims, 6 Drawing Sheets

Related U.S. Application Data continuation of application No. 14/725,459, filed on May 29, 2015, now Pat. No. 10,412,796, which is a continuation of application No. 14/261,613, filed on Apr. 25, 2014, now Pat. No. 9,049,764, which is a continuation of application No. 12/978,836, filed on Dec. 27, 2010, now Pat. No. 8,742,677.

(60) Provisional application No. 61/335,749, filed on Jan. 11, 2010.

(58) Field of Classification Search
USPC .................................................. 315/274, 294
See application file for complete search history.

(56) References Cited

U.S. PATENT DOCUMENTS

| | | | |
|---|---|---|---|
| 6,088,244 A * | 7/2000 | Shioya | H02M 1/32 |
| | | | 323/902 |
| 6,091,614 A | 7/2000 | Malenfant | |
| 6,144,222 A | 11/2000 | Ho | |
| 6,344,981 B1 | 2/2002 | Norton et al. | |
| 6,538,908 B2 | 3/2003 | Balakrishnan et al. | |
| 6,611,439 B1 * | 8/2003 | Yang | H02M 3/33523 |
| | | | 363/41 |
| 6,842,350 B2 | 1/2005 | Yamada et al. | |
| 6,853,563 B1 | 2/2005 | Yang et al. | |
| 6,977,824 B1 | 12/2005 | Yang et al. | |
| 7,038,399 B2 | 5/2006 | Lys et al. | |
| 7,045,973 B2 | 5/2006 | Schallmoser | |
| 7,245,089 B2 | 7/2007 | Yang | |
| 7,502,235 B2 | 3/2009 | Huang et al. | |
| 7,616,461 B2 | 11/2009 | Yang et al. | |
| 7,888,881 B2 | 2/2011 | Shteynberg et al. | |
| 8,098,506 B2 | 1/2012 | Saint-Pierre | |
| 8,222,832 B2 | 7/2012 | Zheng et al. | |
| 8,344,657 B2 | 1/2013 | Zhan et al. | |
| 8,466,628 B2 | 6/2013 | Shearer et al. | |
| 8,742,677 B2 | 6/2014 | Yang et al. | |
| 9,433,045 B2 | 8/2016 | Chiang | |
| 2004/0095101 A1 * | 5/2004 | Pidutti | H02M 1/4225 |
| | | | 323/222 |
| 2008/0048633 A1 | 2/2008 | Li et al. | |
| 2008/0170420 A1 | 7/2008 | Yang et al. | |
| 2008/0203984 A1 | 8/2008 | Omi | |
| 2008/0278092 A1 | 11/2008 | Lys et al. | |
| 2009/0174347 A1 | 7/2009 | Kumagai et al. | |
| 2009/0219000 A1 | 9/2009 | Yang | |
| 2010/0013409 A1 | 1/2010 | Quek et al. | |
| 2010/0141178 A1 | 6/2010 | Negrete et al. | |
| 2010/0308733 A1 | 12/2010 | Shao | |
| 2010/0320934 A1 * | 12/2010 | Liu | H02M 1/4258 |
| | | | 315/294 |
| 2011/0012530 A1 | 1/2011 | Zheng et al. | |
| 2011/0019316 A1 * | 1/2011 | Zhan | H02H 9/002 |
| | | | 361/18 |
| 2011/0037414 A1 * | 2/2011 | Wang | H05B 45/385 |
| | | | 315/297 |
| 2011/0103104 A1 * | 5/2011 | Zhan | H02M 3/33507 |
| | | | 363/21.17 |
| 2011/0175543 A1 | 6/2011 | Sun et al. | |
| 2011/0266969 A1 | 11/2011 | Ludorf | |
| 2011/0279044 A1 | 11/2011 | Maiw | |
| 2012/0025736 A1 | 2/2012 | Singh et al. | |
| 2012/0319621 A1 | 12/2012 | Sutardja et al. | |
| 2013/0134894 A1 | 5/2013 | Kuang | |
| 2013/0249440 A1 | 9/2013 | Doshi et al. | |
| 2014/0062333 A1 | 3/2014 | Sonobe | |
| 2016/0088697 A1 | 3/2016 | Yan et al. | |

FOREIGN PATENT DOCUMENTS

| | | |
|---|---|---|
| JP | 2005-11739 A | 1/2005 |
| TW | M292840 B | 6/2006 |
| TW | 277852 B | 4/2007 |

OTHER PUBLICATIONS

Petition for inter partes review of U.S. Appl. No. 9,049,764, Patent Trial and Appeal Board, filed Apr. 28, 2017.
Petition for inter partes review of U.S. Pat. No. 9,049,764, Patent Trial and Appeal Board, filed Apr. 28, 2017.
The United States District Court for the Northern District of California, San Francisco Division, Case 3:15-cv-04854-MMC, Document 52, Filed Apr. 29, 2016, *Power Integrations, Inc.*, Plaintiff, Versus *Fairchild Semiconductor International, Inc., Fairchild Semiconductor Corporation, and Fairchild* (Taiwan) *Corporation*, Defendants, 32 pages.
Curriculum Vitae of William K. Bohannon, 6 pages.
Declaration of William Bohannon, IPR of U.S. Pat. No. 9,049,764, Apr. 28, 2017, 86 pages.
"Process Dynamics and Control," Dale E. Seborg, et al., 3rd Edition, p.cm., Library of Congress Cataloging-in-Publication Data, ISBN 978-0-470-12867-1, Excerpt pp. 274-275, Fig 15.1-15.2, 4 pages.
American Heritage College Dictionary, 3rd Edition, p.cm., Library of Congress Cataloging-in-Publication Data, ISBN 0-395-66917-0, Excerpts p. 877, p. 1150, p. 303, 6 pages.
The United States Patent and Trademark Office; Preliminary Amendment in Re-Issue Application; Semiconductor Components Industries, LLC; Filed Oct. 24, 2017; 7 pages.
The United States Patent and Trademark Office; Disclaimer in Re-Issue Application; Semiconductor Components Industries, LLC; Filed Oct. 24, 2017; 1 page.
Ta-Yung Yang, et al.; Petition for Inter Partes Review of United States, U.S. Pat. No. 9,049,764; "LED Drive Circuit With a Programmable Input for LED Lighting"; Trial No. IPR2017-01329; Apr. 28, 2017; 81 pages.
Decision.Institution of Inter Partes Review; Case IPR2017-01329; U.S. Pat. No. 9,049,764; "LED Drive Circuit With a Programmable Input for LED Lighting"; Nov. 8, 2017; 28 pages.
Ta-Yung Yang, et al.; Petition for Inter Partes Review of United States, U.S. Pat. No. 9,049,764; "LED Drive Circuit With a Programmable Input for LED Lighting"; Trial No. IPR2017-01330: 10256-0041IP3; Apr. 28, 2017; 79 pages.
Decision.Institution of Inter Partes Review; Case IPR2017-01330; U.S. Pat. No. 9,049,764; "LED Drive Circuit With a Programmable Input for LED Lighting"; Nov. 8, 2017; 20 pages.
Ta-Yung Yang, et al.; Petition for Inter Partes Review of United States, U.S. Pat. No. 9,049,764; "LED Drive Circuit With a Programmable Input for LED Lighting"; Trial No. IPR2017-01331; Apr. 28, 2017; 66 pages.
Decision.Institution of Inter Partes Review; Case IPR2017-01331; U.S. Pat. No. 9,049,764; "LED Drive Circuit With a Programmable Input for LED Lighting"; Nov. 8, 2017; 19 pages.
Final Written Decision in inter partes review; 35 U.S.C. §318(a) and 37C.F.R. §42.73; IPR2017-01329; U.S. Pat. No. 9,049,764 B2; Paper No. 33; Nov. 7, 2018; 37 pages.

* cited by examiner

LED DRIVE CIRCUIT WITH A PROGRAMMABLE INPUT FOR LED LIGHTING

This application is a continuation of application Ser. No. 16/521,834, filed Jul. 25, 2019, which is a continuation of application Ser. No. 14/725,459, filed May 29, 2015, now U.S. Pat. No. 10,412,796, issued Sep. 10, 2019, which is a continuation of application Ser. No. 14/261,613, filed Apr. 25, 2014, now U.S. Pat. No. 9,049,764, issued Jun. 2, 2015, which is a continuation of application Ser. No. 12/978,836, filed Dec. 27, 2010, now U.S. Pat. No. 8,742,677, which was based on Provisional Application No. 61/335,749, filed Jan. 11, 2010.

BACKGROUND

Field of the Disclosure

The present invention relates to a LED lighting, and more particularly, the present invention relates to a switching regulator with programmable input.

Description of Related Art

The LED driver is used to control the brightness of the LED in accordance with its characteristics. The LED driver is also utilized to control the current that flows through the LED. The present invention provides a primary-side controlled switching regulator with a programmable input for a LED driver. One object of this invention is to improve the power factor (PF) of the LED driver. The programmable input can also be used for the dimming control. It is another object of the invention.

SUMMARY OF THE INVENTION

It is an objective of the present invention to provide a LED drive circuit with programmable input. It can modulate the switching signal to regulate the output current for improving the power factor (PF) of the LED drive circuit.

It is an objective of the present invention to provide a LED drive circuit with programmable input. The programmable input can be used for the dimming control.

The LED drive circuit according to the present invention comprises a controller and a programmable signal. The controller generates a switching signal coupled to switch a magnetic device for generating an output current to drive a plurality of LEDs. The programmable signal is coupled to regulate a current-control signal of the controller. The switching signal is modulated in response to the current-control signal for regulating the output current. The level of the output current is correlated to the current-control signal. Further, the programmable signal is coupled to control a reference signal of the controller. The switching signal is modulated in response to the reference signal. The level of the output current is correlated to the reference signal.

The LED driver according to the present invention comprises a controller and a programmable signal. The controller generates a switching signal coupled to switch a transformer for generating a current input signal coupled to the controller and an output current connected to drive a plurality of LEDs. The programmable signal is coupled to modulate the current input signal. The current input signal is further coupled to generate a current-control signal. The current input signal is correlated to a switching current of the transformer. The switching signal is controlled in response to the current-control signal. The level of the output current is correlated to the current-control signal.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention. In the drawings, FIG. 1 shows a circuit diagram of a preferred embodiment of a LED drive circuit in accordance with the present invention.

DETAILED DESCRIPTION OF PREFERRED EMBODIMENTS

Figure 1:
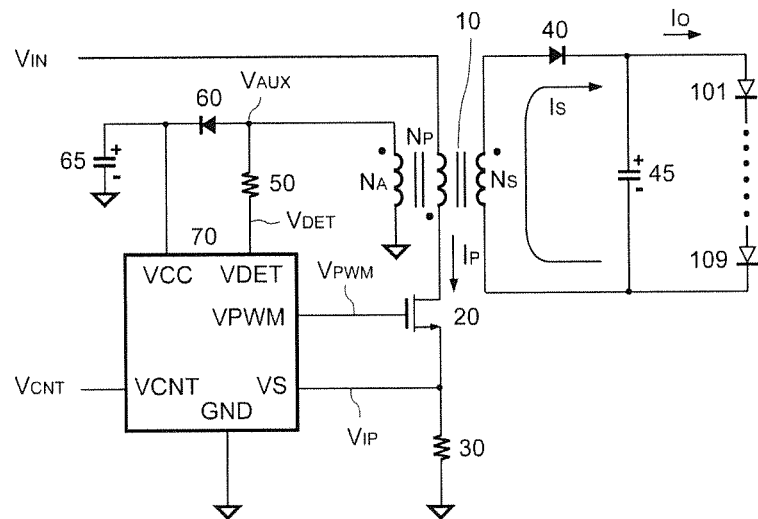

FIG. 1 is a circuit diagram of a preferred embodiment of a LED drive circuit in accordance with the present invention. The LED drive circuit, which is presently preferred to be a LED circuit or a LED driver. An offline transformer 10 is a magnetic device including a primary winding $N_P$, an auxiliary winding $N_A$ and a secondary winding $N_S$. One terminal of the primary winding $N_P$ is coupled to receive an input voltage $V_{IN}$. The other terminal of the primary winding $N_P$ is coupled to a drain terminal of a power transistor 20. The power transistor 20 is utilized to switch the offline transformer 10. One terminal of the secondary winding $N_S$ connects one terminal of a rectifier 40. A filter capacitor 45 is coupled between the other terminal of the rectifier 40 and the other terminal of the secondary winding $N_S$. A plurality of LEDs 101 . . . 109 are connected in series and connected to the filter capacitor 45 in parallel.

A controller 70 comprises a supply terminal VCC, a voltage-detection terminal VDET, a ground terminal GND, a current-sense terminal VS, an input terminal VCNT and an output terminal $V_{PWM}$. The controller 70 is a primary-side controller that is coupled to control the power transistor 20 for switching the primary winding $N_P$ of the magnetic device. The voltage-detection terminal VDET is coupled to the auxiliary winding $N_A$ via a resistor 50 to receive a voltage-detection signal $V_{DET}$ for detecting a reflected voltage $V_{AUX}$. The voltage-detection signal $V_{DET}$ is correlated to the reflected voltage $V_{AUX}$. The reflected voltage $V_{AUX}$ further charges a capacitor 65 via a rectifier 60 for powering the controller 70. The capacitor 65 is coupled to the supply terminal VCC of the controller 70.

The current-sense terminal VS is coupled to a current-sense resistor 30. The current-sense resistor 30 is coupled from a source terminal of the power transistor 20 to a ground for converting a switching current $I_P$ of the magnetic device to a current input signal $V_{IP}$. The switching current $I_P$ flows the power transistor 20. The output terminal $V_{PWM}$ outputs a switching signal $V_{PWM}$ to switch the offline transformer 10. The controller 70 generates the switching signal $V_{PWM}$ to switch the magnetic device through the power transistor 20 for generating an output current $I_O$ and controlling the switching current $I_P$. The output current $I_O$ is coupled to drive LEDs 101 . . . 109. The input terminal VCNT receives a programmable signal $V_{CNT}$ to control the switching current $I_P$ and the output current $I_O$.

Figure 2:
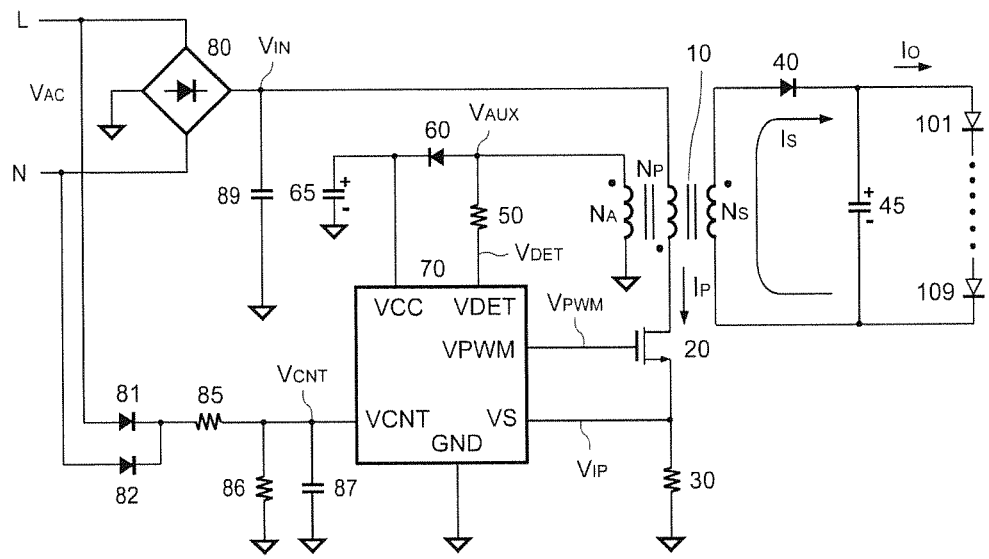
FIG. 2 is another preferred embodiment of the LED drive circuit in accordance with the present invention.

FIG. 2 is another preferred embodiment of the LED drive circuit in accordance with the present invention. Comparing with FIG. 1 and FIG. 2, the primary winding $N_P$ is coupled to receive the input voltage $V_{IN}$ rectified and filtered by a bridge rectifier 80 and a bulk capacitor 89 from an AC input $V_{AC}$. The AC input $V_{AC}$ is coupled to an input of the bridge rectifier 80. The bulk capacitor 89 is coupled between an output of the bridge rectifier 80 and the ground. Moreover, the programmable signal $V_{CNT}$ is generated at the input terminal VCNT in response to the AC input $V_{AC}$ of the LED drive circuit through diodes 81 and 82, a voltage divider formed by resistors 85 and 86, a filter capacitor 87. Anodes of the diodes 81 and 82 are coupled to receive the AC input $V_{AC}$. One terminal of the resistor 85 is coupled to cathodes of the diodes 81 and 82. The resistor 86 is connected between the other terminal of the resistor 85 and the ground. The filter capacitor 87 is connected to the resistor 86 in parallel. The filter capacitor 87 is further coupled to the input terminal VCNT. Other circuits of this embodiment are the same as the embodiment of FIG. 1, so there is no need to describe them again.

Figure 3:
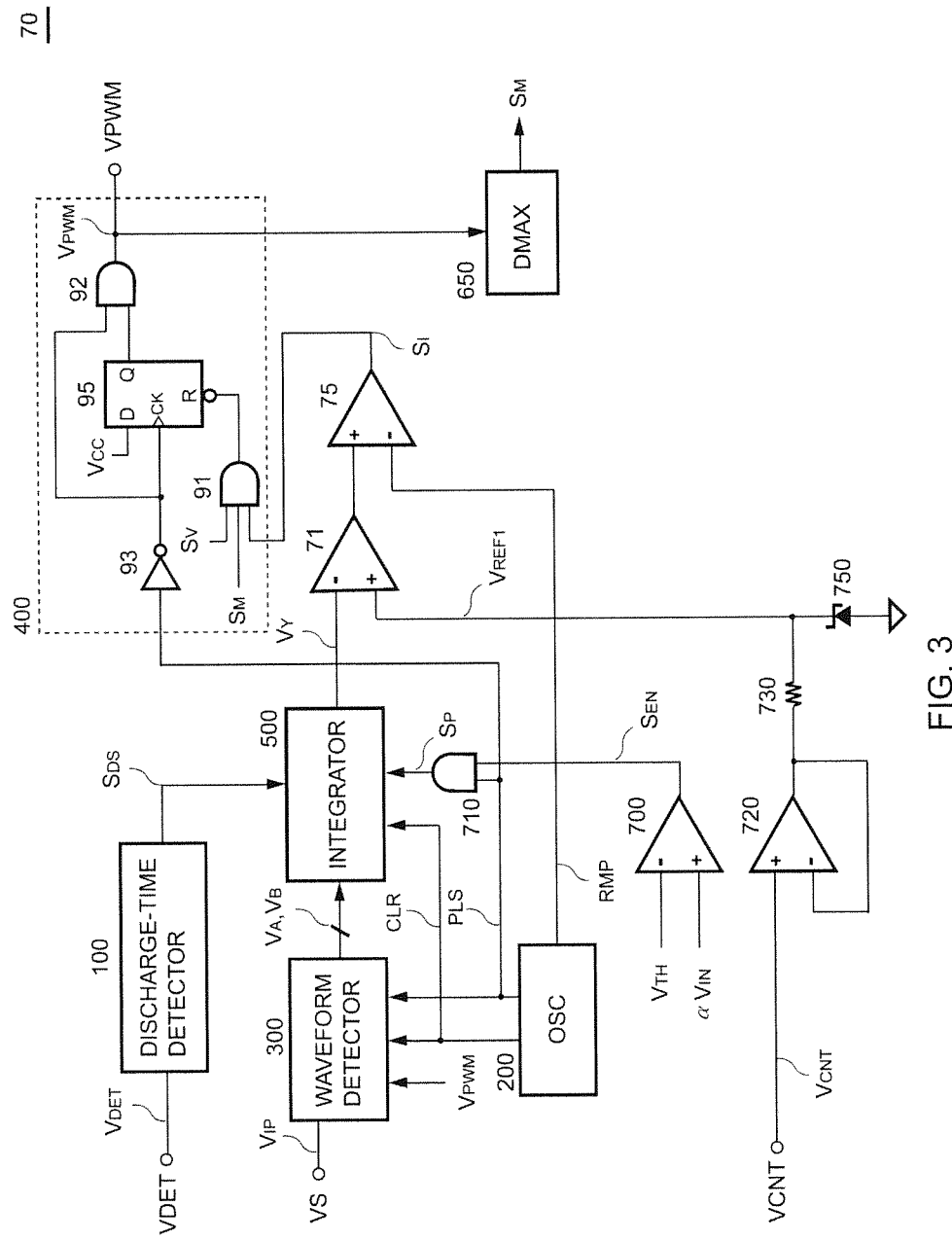
FIG. 3 is a preferred embodiment of the controller in accordance with the present invention.

FIG. 3 is a preferred embodiment of the controller in accordance with the present invention. The controller 70 is a primary-side controller coupled to switch the primary winding $N_P$ of the offline transformer 10. The detail description of the primary-side controlled regulator can be found in a prior art "Control circuit for controlling output current at the primary side of a power converter" U.S. Pat. No. 6,977,824.

A waveform detector 300 detects the witching switching current $I_P$ (as shown in FIG. 1) and generates current-waveform signals $V_A$ and $V_B$ by sampling the current input signal $V_{IP}$ through the current-sense terminal VS. The waveform detector 300 further receives the switching signal $V_{PWM}$, a pulse signal PLS and a clear signal CLR. A discharge-time detector 100 receives the voltage-detection signal $V_{DET}$ via the auxiliary winding $N_A$ (as shown in FIG. 1) to detect the discharge-time of a secondary side switching current $I_S$ and generate a discharge-time signal $S_{DS}$. The secondary side switching current $I_S$ is proportional to the switching current $I_P$. The pulse width of the discharge-time signal $S_{DS}$ is correlated to the discharge-time of the secondary side switching current $I_S$. The output current $I_O$ is correlated to the secondary side switching current $I_S$. An oscillator (OSC) 200 generates the pulse signal PLS coupled to a PWM circuit 400 to determine the switching frequency of the switching signal $V_{PWM}$. The oscillator 200 further generates the clear signal CLR that is coupled to the waveform detector 300 and an integrator 500.

Figure 4:
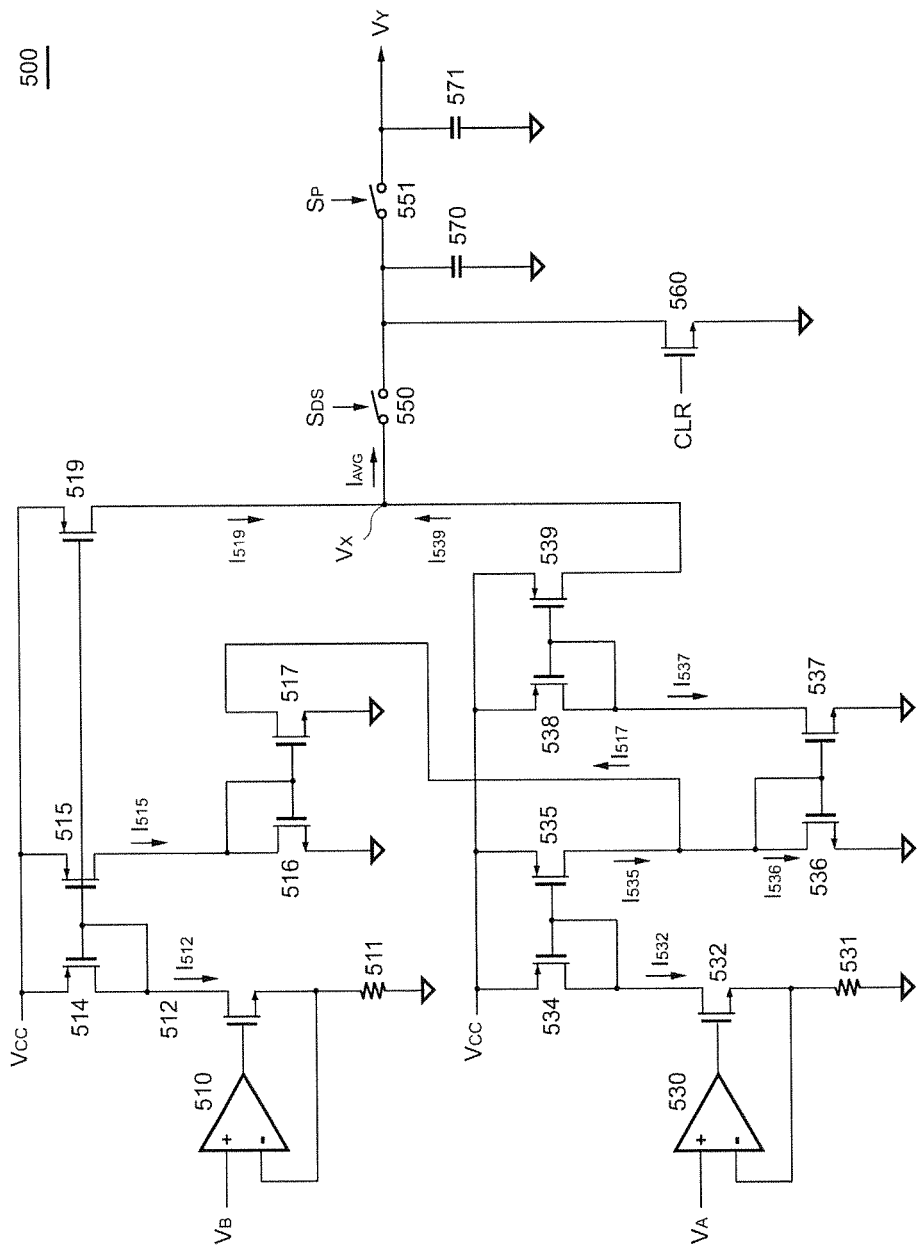
FIG. 4 is a preferred embodiment of the integrator in accordance with the present invention.

The integrator 500 is used to generate a current signal $V_Y$ by integrating an average current signal $I_{AVG}$ (as shown in FIG. 4) with the discharge-time signal $S_{DS}$. The average current signal $I_{AVG}$ is produced in response to the current-waveform signals $V_A$ and $V_B$. A time constant of the integrator 500 is correlated with a switching period T of the switching signal $V_{PWM}$. The current signal $V_Y$ is therefore related to the output current $I_O$. An operational amplifier 71 and a reference signal $V_{REF1}$ develop an error amplifier for output current control. A positive input of the operational amplifier 71 is coupled to receive the reference signal $V_{REF1}$. A negative input of the operational amplifier 71 is coupled to receive the current signal $V_Y$. The error amplifier amplifies the current signal $V_Y$ and provides a loop gain for output current control.

A comparator 75 is associated with the PWM circuit 400 for controlling the pulse width of the switching signal $V_{PWM}$ in response to an output of the error amplifier. A positive input and a negative input of the comparator 75 are coupled to receive the output of the error amplifier and a ramp signal RMP respectively. The ramp signal RMP is provided by the oscillator 200. An output of the comparator 75 generates a current-control signal $S_I$ for controlling the pulse width of the switching signal $V_{PWM}$. A current control loop is formed from detecting the switching current $I_P$ to modulate the pulse width of the switching signal $V_{PWM}$. The current control loop controls the magnitude of the switching current $I_P$ in response to the reference signal $V_{REF1}$.

The PWM circuit 400 outputs the switching signal $V_{PWM}$ for switching the offline transformer 10. The PWM circuit 400 according to one embodiment of the present invention comprises a D flip-flop 95. an inverter 93, an AND gate 91 and an AND gate 92. A D input of the D 95 is supplied with a supply voltage $V_{CC}$. An output of the inverter 93 is coupled to a clock input CK of the D flip-flop 95. The pulse signal PLS sets the D flip-flop 95 through the inverter 93. An output Q of the D flip-flop 95 is coupled to a first input of the AND gate 92. A second input of the AND gate 92 is coupled to the output of the inverter 93 and receives the pulse signal PLS through the inverter 93. An output of the AND gate 92 is also an output of the PWM circuit 400 that generates the switching signal $V_{PWM}$. The D flip-flop 95 is reset by an output of the AND gate 91.

A first input of the AND gate 91 is supplied with a voltage-control signal $S_V$. The voltage-control signal $S_V$ is generated by a voltage control loop, in which the voltage control loop is utilized to regulate the output voltage $V_O$. A second input of the AND gate 91 is coupled to receive the current-control signal $S_I$ for achieving output current control. A third input of the AND gate 91 is coupled to receive a maximum-duty signal $S_M$. The voltage-control signal $S_V$, the current-control signal $S_I$ and the maximum-duty signal $S_M$ can reset the D flip-flop 95 for shorten the pulse width of the switching signal $V_{PWM}$ so as to regulate the output voltage $V_O$ and the output current $I_O$. The maximum-duty signal $S_M$ is generated by a maximum duty circuit (DMAX) 650. The maximum duty circuit 650 can be utilized to limit the maximum-duty of the switching signal $V_{PWM}$ under 50%.

A positive input of a comparator 700 is coupled to receive a detect signal α $V_{IN}$. A low-voltage threshold $V_{TH}$ is supplied with a negative input of the comparator 700. An enable signal $S_{EN}$ is generated at an output of the comparator 700 by comparing the detect signal α $V_{IN}$ with the low-voltage threshold $V_{IN}$. The detect signal α $V_{IN}$ is correlated to the input voltage $V_{IN}$. The output of the comparator 700 generates the enable signal $S_{EN}$ coupled to control an AND gate 710. Two inputs of the AND gate 710 receives the pulse signal PLS and the enable signal $S_{EN}$ respectively. An output of the AND gate 710 generates a sample signal $S_P$ coupled to the integrator 500. The detail description for input voltage $V_{IN}$ detection can be found in prior arts "Control method and circuit with indirect input voltage detection by switching current slope detection" U.S. Pat. No. 7,616,461 and "Detection circuit to detect input voltage of transformer and detection method for the same" U.S. 2008/0048633 A1.

The programmable signal $V_{CNT}$ generated at the input terminal VCNT is supplied to a positive input of a buffer amplifier 720. A negative input of the buffer amplifier 720 is connected to its output. A resistor 730 is coupled between the output of the buffer amplifier 720 and a reference voltage device 750. The reference voltage device 750 is connected to the reference signal $V_{REF1}$ to clamp the maximum voltage of the reference signal $V_{REF1}$. The reference voltage device 750 can be implemented by a zener diode. The programmable signal $V_{CNT}$ is coupled to regulate the current-control signal $S_I$ of the controller 70 through controlling the reference signal $V_{REF1}$ of a current-loop. Furthermore, the programmable signal $V_{CNT}$ is coupled to control the reference signal $V_{REF1}$ of the current-loop of the controller 70. The switching signal $V_{PWM}$ is modulated in response to the current-control signal $S_I$ for regulating the output current $I_O$, and the level of the output current $I_O$ is correlated to the current-control signal $S_I$. In other words, the switching signal $V_{PWM}$ is modulated in response to the reference signal $V_{REF1}$, and the level of the output current $I_O$ is correlated to the reference signal $V_{REF1}$.

FIG. 4 is a preferred embodiment of the integrator in accordance with the present invention. An amplifier 510, a resistor 511 and a transistor 512 construct a first V-to-I converter to generate a first current $I_{512}$ in response to the current-waveform signal $V_B$. A positive input of the amplifier 510 is supplied with the current-waveform signal $V_B$. A negative input of the amplifier 510 is coupled to a source terminal of the transistor 512 and one terminal of the resistor 511. The other terminal of the resistor 511 is coupled to the ground. An output of the amplifier 510 is coupled to a gate terminal of the transistor 512. A drain terminal of the transistor 512 generates the first current $I_{512}$.

Transistors 514, 515 and 519 form a first current mirror for producing a current $I_{515}$ and a current $I_{519}$ by mirroring the first current $I_{512}$. Source terminals of the transistors 514, 515 and 519 of the first current mirror are coupled to the supply voltage $V_{CC}$. Gate terminals of the transistors 514, 515, 519 and drain terminals of the transistors 512, 514 are connected together. Drain terminals of the transistors 515 and 519 generate the current $I_{515}$ and $I_{519}$ respectively. Transistors 516 and 517 form a second current mirror for generating a current $I_{517}$ by mirroring the current $I_{515}$. Source terminals of the transistors 516 and 517 of the second current mirror are coupled to the ground. Gate terminals of the transistors 516, 517 and drain terminals of the transistors 516, 515 are connected together. A drain terminal of the transistor 517 generates the current $I_{517}$.

An amplifier 530, a resistor 531 and a transistor 532 form a second V-to-I converter for generating a second current $I_{532}$ in response to the current-waveform signal $V_A$. A positive input of the amplifier 530 is supplied with the current-waveform signal $V_A$. A negative input of the amplifier 530 is coupled to a source terminal of the transistor 532 and one terminal of the resistor 531. The other terminal of the resistor 531 is coupled to the ground. An output of the amplifier 530 is coupled to a gate terminal of the transistor 532. A drain terminal of the transistor 532 generates the second current $I_{532}$. Transistors 534 and 535 form a third current mirror for producing a current $I_{535}$ by mirroring the second current $I_{532}$. Source terminals of the transistors 534 and 535 of the third current mirror are coupled to the supply voltage $V_{CC}$. Gate terminals of the transistors 534, 535 and drain terminals of the transistors 532, 534 are connected together. A drain terminal of the transistor 535 generates the current $I_{535}$.

Transistors 536 and 537 develop a fourth current mirror for producing a current $I_{537}$ in response to the current $I_{535}$ and the current $I_{517}$. Source terminals of the transistors 536 and 537 of the fourth current mirror are coupled to the ground. Gate terminals of the transistors 536, 537 and drain terminals of the transistors 536, 535 are connected together. The drain terminal of the transistor 536 and a drain terminal of the transistor 537 generate a current $I_{536}$ and the current $I_{537}$ respectively. The current $I_{536}$ can be expressed by $I_{536}=I_{535}-I_{517}$. The geometric size of the transistor 536 is twice the size of the transistor 537. Therefore the current $I_{537}$ is the current $I_{536}$ divided by 2. Transistors 538 and 539 form a fifth current mirror for generating a current $I_{539}$ by mirroring the current $I_{537}$. Source terminals of the transistors 538 and 539 of the fifth current mirror are coupled to the supply voltage $V_{CC}$. Gate terminals of the transistors 538, 539 and drain terminals of the transistors 538, 537 are connected together. A drain terminal of the transistor 539 generates the current $I_{539}$. The drains of the transistor 519 and the transistor 539 are coupled together for generating the average current signal $I_{AVG}$ by summing the current $I_{519}$ and the current $I_{539}$. A current feedback signal $V_X$ is therefore generated at the drain terminals of the transistor 519 and the transistor 539. The resistor 511, the resistor 531 and a capacitor 570 determine the time constant of the integrator 500, and the resistor 531 is correlated to the resistor 511.

A switch 550 is coupled between the drain terminal of the transistor 519 and the capacitor 570. The switch 550 is controlled by the discharge-time signal $S_{DS}$ and turned on only during the period of the discharge-time of the secondary side switching current $I_S$. A transistor 560 is coupled to the capacitor 570 in parallel to discharge the capacitor 570. The transistor 560 is turned on by the clear signal CLR. The integrator 500 further includes a sample-and-hold circuit formed by a sample switch 551 and an output capacitor 571. The sample switch 551 is coupled between the capacitor 570 and the output capacitor 571. The switch 551 controlled by the sample signal $S_P$ serves to periodically sample the voltage across the capacitor 570 to the output capacitor 571. The current signal $V_Y$ is therefore generated across the output capacitor 571. The sample-and-hold circuit is coupled to sample the current feedback signal $V_X$ for generating the current-control signal $S_I$ (as shown in FIG. 3). The current feedback signal $V_X$ is correlated to the switching current $I_P$ of the offline transformer 10 (as shown in FIG. 1). In other words, the sample-and-hold circuit is coupled to sample the current input signal $V_{IP}$ (as shown in FIG. 1) for generating the current-control signal $S_I$. As shown in FIG. 3, the sample-and-hold circuit will stop sampling the current feedback signal $V_X$ once the input voltage $V_{IN}$ of the drive circuit is lower than the low-voltage threshold $V_{TH}$. In other words, the sample-and-hold circuit will stop sampling the current feedback signal $V_X$ once the AC input $V_{AC}$ (as shown in FIG. 2) is lower than the low-voltage threshold $V_{TH}$. The AND gate 710 generates the sample signal $S_P$ for sampling of the current feedback signal $V_X$.

Figure 5:
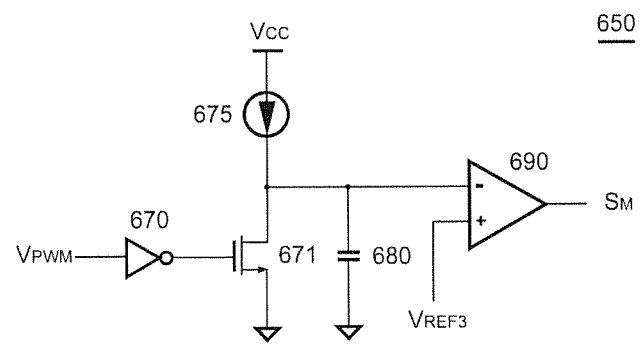
FIG. 5 shows a preferred embodiment of the maximum duty circuit in accordance with the present invention.

FIG. 5 shows a preferred embodiment of the maximum duty circuit 650 in accordance with the present invention. The maximum duty circuit 650 includes an inverter 670, a transistor 671, a current source 675, a capacitor 680 and a comparator 690. A gate terminal of the transistor 671 receives the switching signal $V_{PWM}$ through the inverter 670. The switching signal $V_{PWM}$ is coupled to control the transistor 671. The current source 675 is coupled between the supply voltage $V_{CC}$ and a drain terminal of the transistor 671. A source terminal of the transistor 671 is coupled to the ground. The capacitor 680 is connected between the drain terminal of the transistor 671 and the ground. The transistor 671 is coupled to the capacitor 680 in parallel to discharge the capacitor 680 when the switching signal $V_{PWM}$ is disabled. The current source 675 is connected to the supply voltage $V_{CC}$ and is used to charge the capacitor 680 when the switching signal $V_{PWM}$ is enabled. The current source 675 and the capacitance of the capacitor 680 determine the pulse-width and the amplitude of the voltage across the capacitor 680. A negative input of the comparator 690 is coupled to the drain terminal of the transistor 671 and the capacitor 680. A reference signal $V_{REF3}$ is supplied to a positive input of the comparator 690. An output of the comparator 690 generates the maximum duty signal $S_M$. To set up the reference signal $V_{REF3}$ appropriately, the maximum duty circuit 650 can be utilized to limit the maximum-duty of the switching signal $V_{PWM}$ under 50%.

Figure 6:
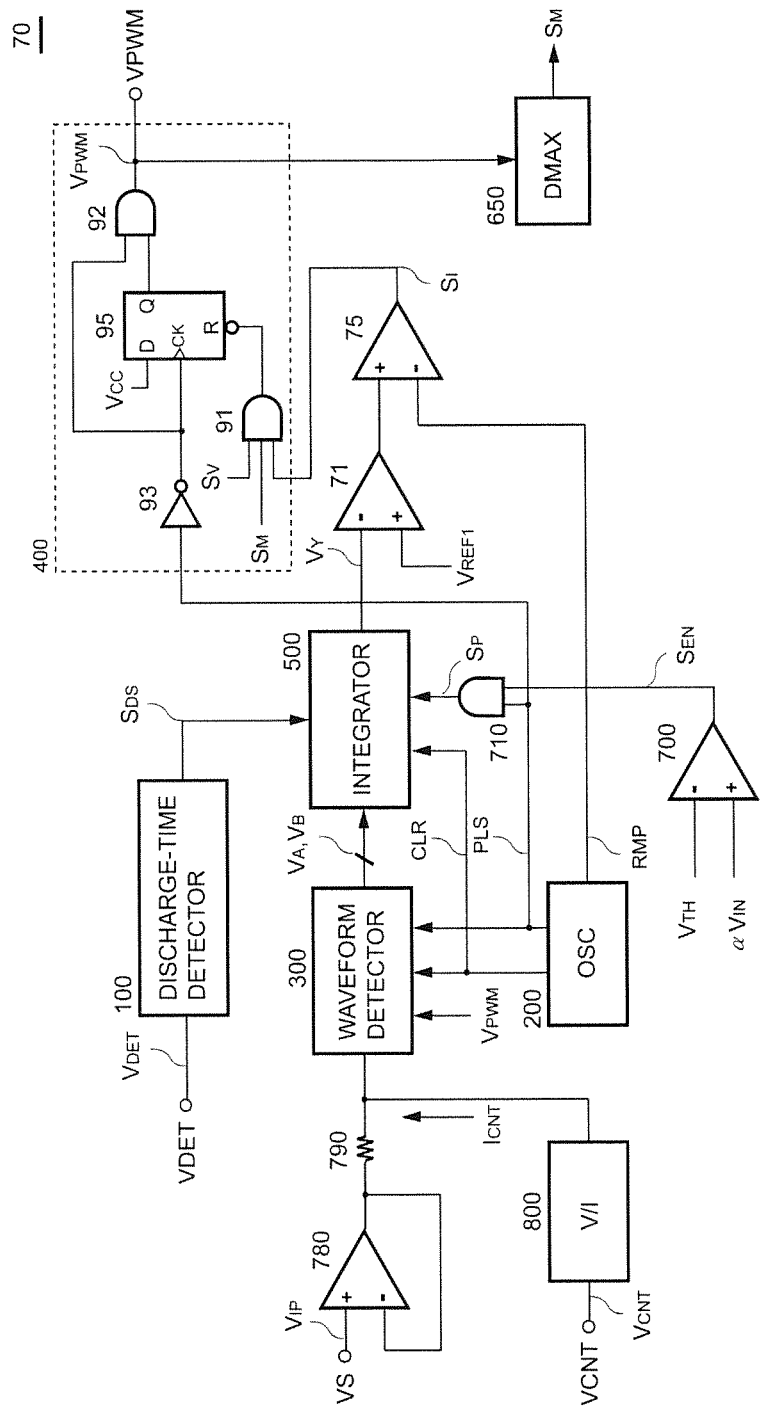
FIG. 6 is another preferred embodiment of the controller in accordance with the present invention.

FIG. 6 is another preferred embodiment of the controller 70 in accordance with the present invention. The controller 70 generates the switching signal $V_{PWM}$ coupled to switch the offline transformer 10 for generating the current input signal $V_{IP}$ (as shown in FIG. 1). A positive input of a buffer amplifier 780 receives the current input signal $V_{IP}$. A negative input of the buffer amplifier 780 is coupled to its output. A voltage-to-current converter 800 receives the programmable signal $V_{CNT}$ to generate a programmable current $I_{CNT}$. A resistor 790 is coupled between the output of the buffer amplifier 780 and the output of the voltage-to-current converter 800. The resistor 790 and the output of the voltage-to-current converter 800 are further coupled to the input of the waveform detector 300. The programmable current $I_{CNT}$ is further coupled to the current-sense terminal VS (as shown in FIG. 1) via the resistor 790 and the buffer amplifier 780 for modulating the current input signal $V_{IP}$. Hence, the programmable signal $V_{CNT}$ generated at the input terminal VCNT is coupled to modulate the current input signal $V_{IP}$. Referring to the FIG. 3, the current input signal $V_{IP}$ is further coupled to generate the current-control signal $S_I$. The current input signal $V_{IP}$ is correlated to the switching current $I_P$ of the offline transformer 10 and the programmable signal $V_{CNT}$. The switching signal $V_{PWM}$ is controlled in response to the current-control signal $S_I$, thus the level of the output current $I_O$ is correlated to the current-control signal $S_I$.

Figure 7:
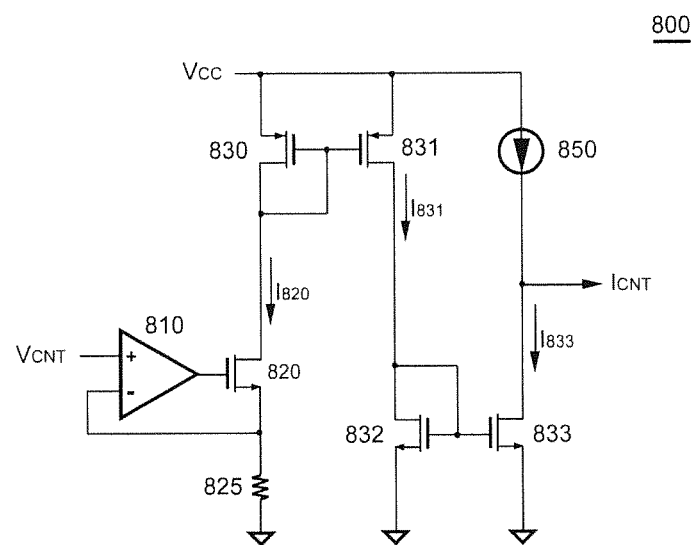
FIG. 7 shows a preferred embodiment of the voltage-to-current converter in accordance with the present invention.

FIG. 7 shows a preferred embodiment of the voltage-to-current converter 800 in accordance with the present invention. The voltage-to-current converter 800 comprises an amplifier 810, a resistor 825, a transistor 820, a first current mirror formed by transistors 830, 831, a current source 850, a second current mirror formed by transistors 832, 833. A positive input of the amplifier 810 receives the programmable signal $V_{CNT}$. A negative input of the amplifier 810 is coupled to a source terminal of the transistor 820 and one terminal of the resistor 825. The other terminal of the resistor 825 is coupled to the ground. An output of the amplifier 810 is coupled to agate terminal of the transistor 820. A drain terminal of the transistor 820 is coupled to the first current mirror and generates a current $I_{820}$.

The first current mirror generates a current $I_{831}$ by mirroring the current $I_{820}$. Source terminals of the transistors 830 and 831 of the first current mirror are coupled to the supply voltage $V_{CC}$. Gate terminals of the transistors 830, 831 and drain terminals of the transistors 830, 820 are connected together. A drain terminal of the transistor 831 generates the current $I_{831}$. The second current mirror is coupled to the drain terminal of the transistor 831 to generate a current $I_{833}$ by mirroring the current $I_{831}$. Source terminals of the transistors 832 and 833 of the second current mirror are coupled to the ground. Gate terminals of the transistors 832, 833 and drain terminals of the transistors 832, 831 are connected together. A drain terminal of the transistor 833 generates the current $I_{833}$. The current source 850 is coupled from the supply voltage $V_{CC}$ to the drain terminal of the transistor 833. The drain terminal of the transistor 833 further outputs the programmable current $I_{CNT}$. As shown in FIG. 6, the programmable current $I_{CNT}$ is to modulate the current input signal $V_{IP}$. The current input signal $V_{IP}$ is correlated to the switching current $I_P$ of the offline transformer 10 and the programmable signal $V_{CNT}$.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An LED (Light Emitting Diode) drive circuit comprising:
   a magnetic device having a first terminal for receiving an input voltage derived from an input of the LED drive circuit, and a second terminal, the magnetic device generating an output current to drive at least one LED;
   a power transistor having a drain coupled to the second terminal of the magnetic device, a control terminal, and a source;
   a current-sense resistor having a first terminal coupled to the source of the power transistor for forming a current input signal, and a second terminal coupled to ground; and
   a controller generating a switching signal coupled to control the power transistor to switch current through the magnetic device by modulating a pulse width of the switching signal based on both a programmable signal derived from the input of the LED drive circuit and different from the input voltage, and the current input signal.

2. The LED drive circuit of claim 1, wherein the magnetic device comprises:
   an offline transformer with a primary winding having a first end forming the first terminal, a second end forming the second terminal, and a secondary winding for generating the output current to drive the at least one LED.

3. The LED drive circuit of claim 1, wherein the LED drive circuit modulates the current input signal by adding a current formed using the programmable signal to the current input signal.

4. The LED drive circuit as claimed in claim 1, wherein the LED drive circuit further comprises:
   a bridge rectifier having an input for receiving an AC input for the input of the LED drive circuit, and an output for providing the input voltage; and
   a bulk capacitor having a first terminal coupled to the output of the bridge rectifier, and a second terminal coupled to ground.

5. The LED drive circuit as claimed in claim 4, wherein the LED drive circuit further comprises:
   a first diode, having an anode for receiving a first component of the AC input, and a cathode;
   a second diode, having an anode for receiving a second component of the AC input, and cathode coupled to the cathode of the first diode;

a voltage divider having an input coupled to the cathodes of the first and second diodes, and an output for providing the programmable signal; and a second capacitor having a first terminal coupled to the cathodes of the first and second diodes, and a second terminal coupled to ground.

6. The LED drive circuit of claim 1, wherein the controller comprises:

a current control loop comprising an amplifier having a first input responsive to the current input signal, a second input for receiving a reference voltage, and an output, wherein the controller modulates the reference voltage in response to the programmable signal.

7. The LED drive circuit of claim 6, wherein the controller further comprises:

a buffer amplifier having a positive input for receiving the programmable signal, a negative input, and an output coupled to the negative input thereof;

a second resistor having a first terminal coupled to the output of the buffer amplifier, and a second terminal forming the reference voltage; and a zener diode having a cathode coupled to the second terminal of the second resistor, and an anode coupled to ground.

8. The LED drive circuit of claim 1, wherein the controller comprises:

a buffer amplifier having an input for receiving a current input signal representative of a current through the magnetic device, and an output;

a second resistor having a first terminal coupled to the output of the buffer amplifier, and a second terminal for providing a modulated current input signal, wherein the controller uses the modulated current input signal in a current control loop; and an input circuit, having an input for receiving the programmable signal, and an output coupled to the second terminal of the second resistor for providing a programmable current thereto.

9. The LED drive circuit of claim 8 wherein the input circuit comprises:

a voltage-to-current converter having an input for receiving the programmable signal, and an output coupled to the second terminal of the second resistor.

10. An LED drive circuit comprising:

a bridge rectifier having an input for receiving an AC input, and an output for providing an input voltage;

a transformer having a primary winding with a first terminal for receiving the input voltage, and a second terminal, and a secondary winding;

a power transistor having a drain terminal coupled to the second terminal of the primary winding of the transformer, and a source terminal;

a current-sense resistor coupled from the source terminal of the power transistor to ground and developing a current input signal on a first terminal thereof;

a programmable signal generation circuit generating a programmable signal in response to the AC input;

a plurality of light emitting diodes (LEDs) connected in series to the secondary winding of the transformer; and a controller generating a switching signal coupled to control the power transistor to switch the primary winding of the transformer by modulating a pulse width of the switching signal based on both the programmable signal and the current input signal.

11. The LED drive circuit of claim 10, wherein the controller generates the switching signal based on both the programmable signal and the current input signal to modulate the switching signal to regulate the output current for improving a power factor (PF) of the LED drive circuit.

12. The LED drive circuit of claim 10, wherein the controller comprises:

a current control loop comprising an amplifier having a first input responsive to the current input signal, a second input for receiving a reference voltage, and an output, wherein the controller modulates the reference voltage in response to the programmable signal.

13. The LED drive circuit of claim 12, wherein the controller further comprises:

a buffer amplifier having a positive input for receiving the programmable signal, a negative input, and an output coupled to the negative input thereof;

a second resistor having a first terminal coupled to the output of the buffer amplifier, and a second terminal forming the reference voltage; and a zener diode having a cathode coupled to the second terminal of the second resistor, and an anode coupled to ground.

14. The LED drive circuit of claim 10, wherein the LED drive circuit modulates the current input signal by adding a current formed using the programmable signal to the current input signal.

15. The LED drive circuit of claim 14, wherein the controller comprises:

a buffer amplifier having an input for receiving a current input signal representative of a current through the transformer, and an output;

a second resistor having a first terminal coupled to the output of the buffer amplifier, and a second terminal for providing a modulated current input signal, wherein the controller uses the modulated current input signal in a current control loop; and an input circuit, having an input for receiving the programmable signal, and an output coupled to the second terminal of the second resistor for providing a programmable current thereto.

16. The LED drive circuit of claim 15, wherein the input circuit comprises:

a voltage-to-current converter having an input for receiving the programmable signal, and an output coupled to the second terminal of the second resistor.

17. The LED drive circuit of claim 10, further comprising:

a rectifier having a first terminal coupled to a first terminal of the secondary winding of the transformer, and a second terminal; and a filter capacitor having a first terminal coupled to the second terminal of the rectifier, and a second terminal coupled to the second terminal of the secondary winding of the transformer, wherein the plurality of light emitting diodes (LEDs) is coupled in series between the second terminal of the rectifier and the second terminal of the secondary winding of the transformer.

18. The LED drive circuit of claim 10, wherein the programmable signal generation circuit comprises:

a first diode having an anode for receiving a first component of the AC input, and a cathode; and a second diode having an anode for receiving a second component of the AC input, and a cathode coupled to the cathode of the first diode, a voltage divider having an input coupled to the cathodes of the first and second diodes, and an output for providing the programmable signal; and a second capacitor having a first terminal coupled to the cathodes of the first and second diodes, and a second terminal coupled to ground, wherein the programmable signal generation circuit generates the programmable signal based on a signal at the cathodes of the first and second diodes.

19. The LED drive circuit of claim 10, further comprising:

a bulk capacitor having a first terminal coupled to the output of the bridge rectifier, and a second terminal coupled to ground.

20. The LED drive circuit of claim 10, wherein:

the controller further comprises a supply terminal;

the transformer further comprises an auxiliary winding having a first terminal, and a second terminal coupled to ground; and the LED drive circuit further comprises a rectifier having an anode coupled to the first terminal of the auxiliary winding, and a cathode coupled to the supply terminal of the controller, and a capacitor having a first terminal coupled to the supply terminal of the controller, and a second terminal coupled to ground.

\* \* \* \* \*